United States Patent Office.

WILLIAM I. SAPP, OF BALTIMORE, MARYLAND, ASSIGNOR TO B. M. RHODES & CO., OF SAME PLACE.

Letters Patent No. 102,438, dated April 26, 1870.

---

IMPROVEMENT IN THE MANUFACTURE OF FERTILIZERS.

The Schedule referred to in these Letters Patent and making part of the same

---

*To all whom it may concern:*

Be it known that I, WILLIAM I. SAPP, of the city and county of Baltimore and State of Maryland, have invented a new and useful Improvement in the Manfacture of Fertilizers, of which the following is a full, clear, and exact description.

The nature of my invention consists in the employment of silicic acid or water glass, for the purpose of dissolving or rendering soluble the phosphates in phosphatic guano, or in the treatment of raw bones, when preparing them for combination with other ingredients which enter into the composition of many of the well-known fertilizers.

In my process of manufacture, I proceed substantially as follows:

I prepare the guano by pulverizing or grinding, when necessary, as is the custom when it is to be treated with sulphuric acid, and then proceed to apply to one ton of Swan's Island guano, containing about thirty-five per cent. of phosphates, eleven hundred pounds of water glass, containing about thirty-five per cent. of silicic acid. This renders nearly or quite all the phosphates in the mass soluble in water, and fits the compound for the further admixture of other ingredients, which are usually employed in the formation of artificial manures, or, if preferred, the mass may be dried and sold without further manipulation.

I do not wish to confine myself to the proportions here given, nor to the mode of operation herein described, as the proportions employed require to be changed to correspond with the different kinds of guano, the strength of the acid, or the percentage of phosphates in the guano required to be rendered soluble.

Having thus described my invention,

What I claim as new, and desire to secure by Letters Patent, is—

The employment of soluble silicic acid or water glass, for rendering soluble the phosphates in phosphatic guano.

Also, the new fertilizer, made from silicated phosphates, produced by the process herein described.

WM. I. SAPP.

Witnesses:
 H. H. DOUBLEDAY,
 G. M. WILLIAMS.